(No Model.)
P. F. HARAN.
SAFETY GUARD FOR STREET CARS.
No. 556,672. Patented Mar. 17, 1896.
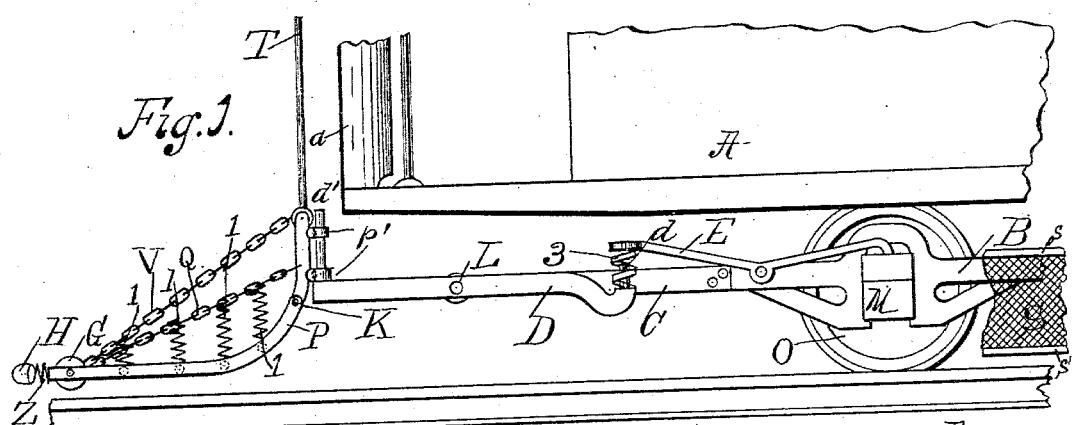
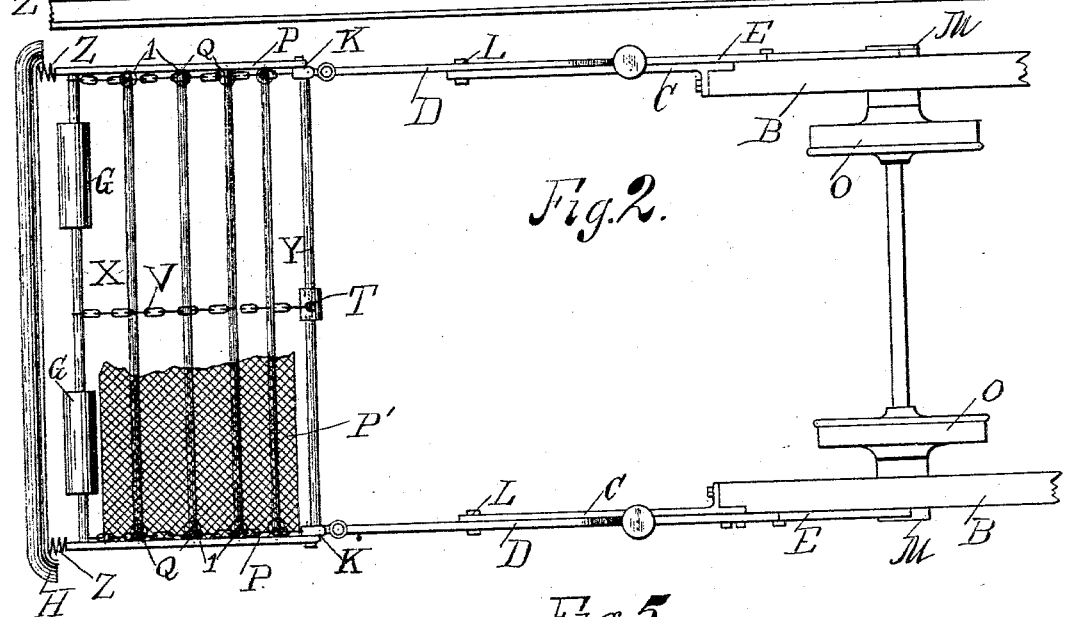
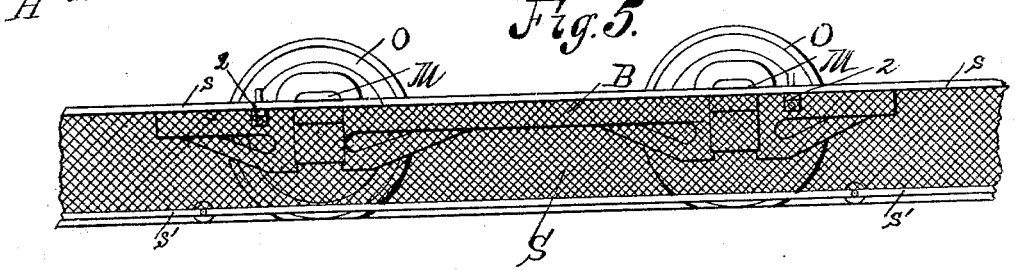
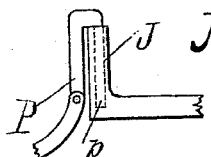
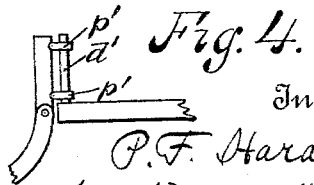
Witnesses
John H. Holt.
John C. Wilson.
Inventor
P. F. Haran,
by Whitman & Wilkinson
Attorneys

UNITED STATES PATENT OFFICE.

PATRICK F. HARAN, OF SCRANTON, PENNSYLVANIA.

SAFETY-GUARD FOR STREET-CARS.

SPECIFICATION forming part of Letters Patent No. 556,672, dated March 17, 1896.

Application filed August 26, 1895. Serial No. 560,563. (No model.)

*To all whom it may concern:*

Be it known that I, PATRICK F. HARAN, a citizen of the United States, residing at Scranton, in the county of Lackawanna and State of Pennsylvania, have invented certain new and useful Improvements in Safety-Guards for Street-Railway Cars; and I do hereby declare the following to be a full, clear, and exact description of the invention, such as will enable others skilled in the art to which it appertains to make and use the same.

My invention relates to improvements in safety-guards to be attached to street-railway cars to prevent anything from getting under the car while in motion by means of a fender kept in a uniform position at all times regardless of the vibration of the car, and also for lessening the injury to persons coming in contact with street-cars. I attain these objects by the mechanism illustrated in the accompanying drawings, in which the same parts are indicated by the same letters and numerals throughout the several views.

Figure 1 is a side elevation of the lower forward end of a car, showing my improved apparatus mounted thereon, parts being broken away. Fig. 2 is a plan of the car-truck, showing the method of attaching the front fender to the front of the car, parts being broken away. Fig. 3 is a detail view of one method of connecting the sustaining-lever and the safety-guard. Fig. 4 is a detail view of another method of connecting the same parts; and Fig. 5 is a side elevation of the truck of the car, showing a netting attached for a wheel-guard on the side of the car.

A, Fig. 1, represents the car-body provided with a dashboard $a$ on the front of the platform.

B represents the truck of the car, supported by the wheels O O.

Since the two sides are symmetrical, the parts on one side only will be described.

C represents an arm projecting from and bolted to the truck B, and D a lever hung on said arm by a hinged bolt L. This lever D extends back far enough to support the bent lever E at its forward end and forward beyond the car to support the fender-frame P.

J represents a socket in the end of the lever D to admit the pin $p$, attached to the frame P, which frame is covered with netting P', a small part of which is shown in Fig. 2. This fender-frame is provided with transverse bars X and Y.

T represents a lever pivoted on the bar Y and operated by the motorman to tilt up the front of the fender in case it be desired to avoid any obstacle on the track, or should it become otherwise necessary or desirable to raise the said frame. This frame is hinged, as at K, and is lifted by a chain V, connected at its lower end to the bar X and at its upper end to the lever T. The bent lever E is attached to the frame of the truck B and rests on the wheel-box M at its one end, and on the spiral spring 3 at its other end. This spiral spring surrounds the upwardly-projecting ends $d$ of the lever D, on which, at its opposite end, the fender-frame is secured. The spring 3 is stiff enough to normally support the end of the fender connected to the levers D clear of the ground, and if any extra weight is thrown on the fender the said spring will yield, allowing the fender to skim along the ground. Moreover in case the car tips forward far enough at any time to strike the outer end of the levers D, then the spring 3 will yield, and thus will save the levers D from being broken.

G G, Fig. 2, represent rollers on the bar X, which serve to lift the front end of the fender over any projection in the street near the track and run along the ground when the car leaves the track. These two rollers may be replaced by a continuous roller on the bar X, as shown in dotted lines in Fig. 2.

H represents a rubber or other elastic buffer placed in front of the fender to relieve the force of the blow. Spiral springs Z are interposed between this buffer and the fender-frame, which also reduce the force of the blow when the fender strikes any object on the track.

Chains Q support the outer end of the fender, and interposed between these chains and the fender-frame are a plurality of spiral springs 1 1 1, set a short distance apart and supporting the netting P', thus making the whole guard flexible and strong.

The fender is attached to the front end of the lever D, carried by the truck, in either of the methods shown in Fig. 3 or in Fig. 4.

In Fig. 3 the pin or pintle $p$ fits in a socket or gudgeon J, which latter is carried at the end of the lever D.

In the device shown in Fig. 4 the pin $d'$ is carried at the end of the lever D and engages in eyes $p'$, made fast to the frame P.

It will be seen that the hinges K will enable the fender to tilt up should any small object of a greater height than the fender is from the ground be lying on the track.

The ordinary height of the fender from the ground would be about three inches; but where the road-bed is smooth the fender may run closer to the ground, if desired.

In addition to the fender already described it will ordinarily be desirable to provide a wheel-guard of some character to prevent objects or persons from getting under the wheels, from falling in sidewise, relative to the car. A device of this character is shown in Fig. 5, in which S represents the netting secured between two bars $s$ and $s'$, the upper one of which bars is suspended on hinges 2 projecting laterally from the car and similar in general construction to the hinge K. (Shown in Figs. 3 and 4.) The bottom bar, $s'$, is provided with rollers R, which are normally held clear of the ground, but which, when they strike any object, will lift up somewhat, causing the whole net to be lifted on the hinges 2. Should the net touch a little ridge of ground alongside of the track it will roll along on these rollers, rising clear of the obstruction.

In the construction of the herein-described apparatus it is preferable to make the frame and all the bars of the fender of gas-pipe, as this is very light and strong, is easily obtainable, and renders it possible to repair the fender with ease in case of accident thereto.

It will be obvious that various modifications of the herein-described apparatus might be made which could be used without departing from the spirit of my invention.

Having thus described my invention, what I claim, and desire to secure by Letters Patent of the United States, is—

1. In a car-fender for street-cars, the combination with a truck and truck-frames, of bars extending forward from the truck-frame, and rigidly attached thereto, a bent lever pivoted to the truck-frame and connected at one end to the journal-boxes of the car, and bearing on a spiral spring at the outer end, a lever pivoted to each of said bars and bearing at its inner end upward on said spiral spring, a fender secured to the outer end of said lever, substantially as described.

2. In a car-fender for street-cars, the combination with a truck and truck-frame, of bars extending forward from the truck-frame, and rigidly attached thereto, a bent lever on each side of the truck-frame, and pivoted thereto, and connected at one end to the journal-box of the car, a spiral spring bearing on the outer end of said bent lever, a second lever pivoted to said bar and bearing at its inner end upward on said spiral spring, a fender secured to the outer end of said lever, and means for tilting said fender when desired, substantially as described.

3. In a car-fender for street-cars, the combination with bars rigidly attached to the truck in each side thereof and projecting toward the end of the car, of a pair of levers, pivoted to said bars, bent levers pivoted to said truck-frame and springs carried thereby adapted to bear on the inner ends of first levers, a curved, hinged fender-frame secured to the front end of said first levers, chains connected from the front to the rear end of said curved fender-frame with springs depending from said chains and connected to the fender, a chain connected to the front end of the fender-frame, and leading upward and backward, a hand-rod connected to the upper end of the chain, whereby the fender may be tilted upward, when desired, substantially as described.

In testimony whereof I affix my signature in presence of two witnesses.

PATRICK F. HARAN.

Witnesses:
H. A. KNAPP,
C. P. O'MALLEY.